Patented Mar. 13, 1951

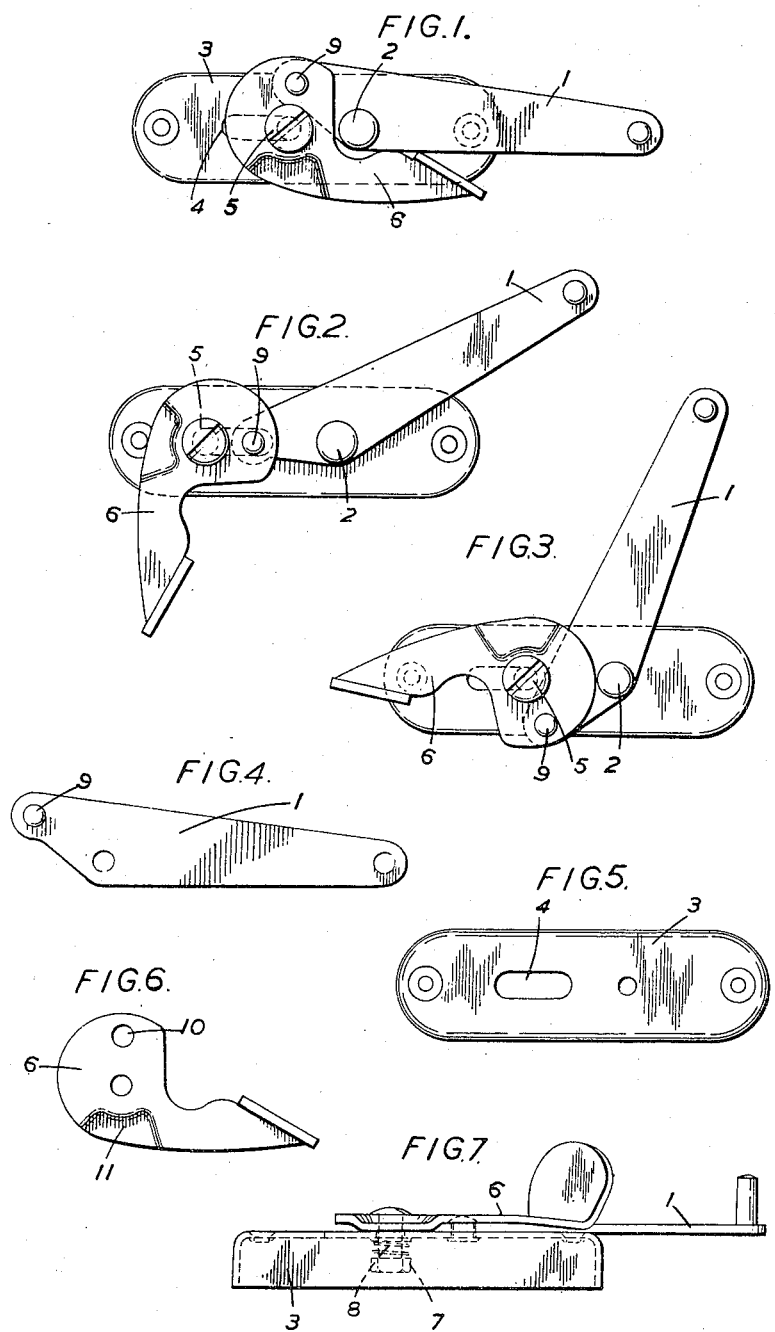

2,545,279

UNITED STATES PATENT OFFICE 2,545,279

COMBINED STAY AND DEVICE FOR OPENING AND CLOSING WINDOWS AND LIKE MEMBERS

Leonard Bayliffe Henderson, Birmingham, England

Application November 10, 1947, Serial No. 785,118 In Great Britain December 12, 1946

1 Claim. (Cl. 268—118)

This invention comprises a combined stay and device for opening and closing windows or like members and for securing the same in the open position and it has for its object a simplified construction which is inexpensive to manufacture and which forms a compact appliance. A further object of the invention resides in an arrangement of lever mechanism which eliminates complicated construction of the appliance.

Referring to the drawings:

Figure 1 is a plan of a mounting device constructed according to this invention, in position with a window closed.

Figure 2 is a similar view with the window partially open.

Figure 3 is a similar view with the window fully open.

Figure 4 is a plan of the stay lever.

Figure 5 is a plan of the mounting member or bracket.

Figure 6 is a plan view of the finger lever, and

Figure 7 is a front view of Figure 1.

According to one embodiment of this invention, a window stay lever 1 is pivotally mounted on the pin 2 intermediate its ends on a mounting member or bracket 3 fixed to the window frame. The mounting bracket 3 has a straight slot 4 therein and a pivot member or pin 5 is mounted in the slot and a finger lever 6 is pivotally mounted on the pin 5. Conveniently, the pin 5 is headed on the outer end to hold the finger lever thereon and is screw threaded on the inner end for receiving a fixing nut 7 or lock nuts on the inner side of the slotted bracket, a spiral spring washer 8 or the like holding the head of the pin spring pressed on the finger lever. The inner end of the stay lever 1 has a pin or projection 9 thereon which engages a perforation 10 in the finger or control lever so that when the finger lever is pivoted, the stay lever is pivoted. The pivot pin 2 is in alignment with the slot 4. The finger lever 6 from the pivot 5 to the pivot 9 forms one link of a pair of toggle links and the stay lever 1 forms the other toggle link from the pivot 9 to the pivot 2, the two links being pivotally connected by the pin 9 and relative movement of the two links is permitted by the pivot 5 which is slidable in the slot 4. When the lever 6 is pivoted clockwise from the position shown by Figure 1 to the position shown by Figure 2, it pivots on the pin 5 which slides from one end of the slot 4 to the other end and the said toggle links have moved into alignment into position shown by Figure 3. On further movement of the finger lever 6 in the clockwise direction, the toggle link formed by such lever 6 pivots on the pin 5 and such pin slides in the slot 4 in the reverse direction. The stay lever 1 is thus moved in an anti-clockwise direction. When the levers 6 and 1 are in the position shown by Figure 1, the toggle link between the pivots 5 and 9 is at right angles to the slot so that on the final closing movement of the window is given by a powerful wedge action on the tail of the lever 1 and the lever 1 is locked in position. Furthermore as a large movement of the finger lever 1 takes place at the final closing movement into the position shown by Figure 1, the lever 1 can be arranged to lie in a compact form on the mounting bracket as shown by Figures 1 and 3. When the lever 1 is in the fully opened position as shown by Figure 3, the toggle link between the pivots 5 and 9 of the finger lever 6 is substantially at right angles to the slot 4 and the stay lever 1 is thereby locked in the fully opened position.

The arrangement and interconnection of the levers 1 and 6 enables a very compact device to be obtained and avoidance of all inconvenient projections is obtained both when the ventilator window is opened or closed. The finger lever 6 is formed as a sheet metal pressing and the stay lever 1 is pivotally connected thereto on one side of its pivot axis and between such lever and the mounting member 1, and a depression is formed on the finger lever 6 on the opposite side of its axis to ride over the surface of the bearing member and to form a stop 11 which bears against the stay lever 1 to limit the opening movement of the window. With the aforedescribed construction, the finger and stay lever can be formed as sheet metal pressings and the mounting bracket may also be formed as a sheet metal pressing. The mounting bracket 3 comprises an elongated dish shaped member having countersunk holes for attachment to the window frame and the elongated recess houses the nut 7 or lock nuts and spring on the inner end of the pivot pin for the finger lever. The frictional grip of the finger lever 6 on the mounting 3 and stay lever 1 may serve as a means for frictionally holding the window in any intermediate position of adjustment.

Having thus described the invention, what is claimed as new and desired to be secured by Letters Patent, is:

I claim:

A device for opening and closing windows, ventilators or the like and for securing the same in open and closed positions, respectively, comprising a mounting member having a flat mounting surface, a stay lever pivotally mounted intermediate its ends on said mounting member to ride over said flat surface when pivoted on said mounting member, a slot in said flat surface of said mounting member, a pivot member slidably mounted in said slot, a finger lever pivotally mounted on said slidably mounted pivot member and pivotally connected to the inner end of said stay lever, said inner end of said stay member being located between the portion of said finger lever pivoted thereto and said flat surface of said mounting member, and a depression portion on said finger lever and located on the side of said pivot member opposite the side pivoted to the stay lever for bearing on said flat surface of said mounting member to support said finger lever on said flat surface of said mounting member and to form a stop for bearing against said stay lever to limit the opening movement of such lever, said finger and said stay levers being so arranged that they form a pair of toggle links, said pair of toggle links being formed by the portion of said finger lever between said slidably mounted pivot member and the pivot connection of said stay lever with such finger lever, said pairs of toggle links extending substantially at right angles to said slot when the window is fully open or fully closed.

LEONARD BAYLIFFE HENDERSON.

REFERENCES CITED

The following references are of record in the file of this patent:

UNITED STATES PATENTS

| Number | Name | Date |
|---|---|---|
| 1,724,011 | Flagg | Aug. 13, 1929 |
| 2,036,939 | Henderson | Apr. 7, 1936 |
| 2,041,094 | Simpson | May 19, 1936 |
| 2,215,170 | Carroll | Sept. 17, 1940 |